United States Patent
Gopalkrishnan et al.

(10) Patent No.: US 6,803,396 B2
(45) Date of Patent: Oct. 12, 2004

(54) STABLE AQUEOUS POLYMERIC SUPERPLASTICIZER SOLUTIONS AND CONCRETE COMPOSITIONS CONTAINING THE SAME

(75) Inventors: Sridhar Gopalkrishnan, Grosse Ile, MI (US); Kenneth L. Zack, Wyandotte, MI (US); Karl-Heinz Buechner, Luwigshafen (DE)

(73) Assignee: BASF Corporation, Mt Olive, NJ (US)

( * ) Notice: Subject to any disclaimer, the term of this patent is extended or adjusted under 35 U.S.C. 154(b) by 168 days.

(21) Appl. No.: 09/930,479

(22) Filed: Aug. 16, 2001

(65) Prior Publication Data

US 2003/0073760 A1 Apr. 17, 2003

(51) Int. Cl.$^7$ .......................... C04B 24/32; C08L 71/02
(52) U.S. Cl. ................ 524/5; 524/4; 524/377; 524/505; 525/88; 525/93
(58) Field of Search .................. 524/4–5, 377, 524/505; 525/88, 93

(56) References Cited

U.S. PATENT DOCUMENTS

| | | | |
|---|---|---|---|
| 5,302,296 A | * | 4/1994 | Evain et al. ................ 210/728 |
| 5,583,183 A | | 12/1996 | Darwin et al. ............ 525/329.4 |
| 5,614,017 A | | 3/1997 | Shawl ............................ 529/5 |
| 5,633,298 A | | 5/1997 | Arfaei et al. .................... 524/5 |
| 5,661,206 A | | 8/1997 | Tranaka et al. ............. 524/378 |
| 5,670,578 A | | 9/1997 | Shawl ......................... 525/187 |
| 5,703,174 A | | 12/1997 | Arfaei et al. ............ 525/329.9 |
| 5,798,425 A | | 8/1998 | Albrecht et al. ............ 526/371 |
| 6,063,184 A | | 5/2000 | Leikauf et al. ................. 524/8 |
| 6,139,623 A | | 10/2000 | Darwin et al. .................. 524/5 |
| 6,277,191 B1 | * | 8/2001 | Budiansky et al. ......... 106/802 |
| 6,358,310 B1 | * | 3/2002 | Berke et al. ................ 106/802 |
| 6,441,054 B1 | * | 8/2002 | Ou et al. ....................... 516/11 |
| 2002/0107310 A1 | | 8/2002 | Shendy et al. .................. 524/2 |
| 2002/0111399 A1 | * | 8/2002 | Bury et al. ..................... 524/2 |

* cited by examiner

*Primary Examiner*—Peter Szekely
(74) *Attorney, Agent, or Firm*—Nixon & Vanderhye P.C.

(57) ABSTRACT

Aqueous superplasticizer solutions for concrete compositions include a polymeric superplasticizer and an air-detraining effective amount of a block polyether containing ethylene oxide and propylene oxide units.

18 Claims, 1 Drawing Sheet

Figure 1:
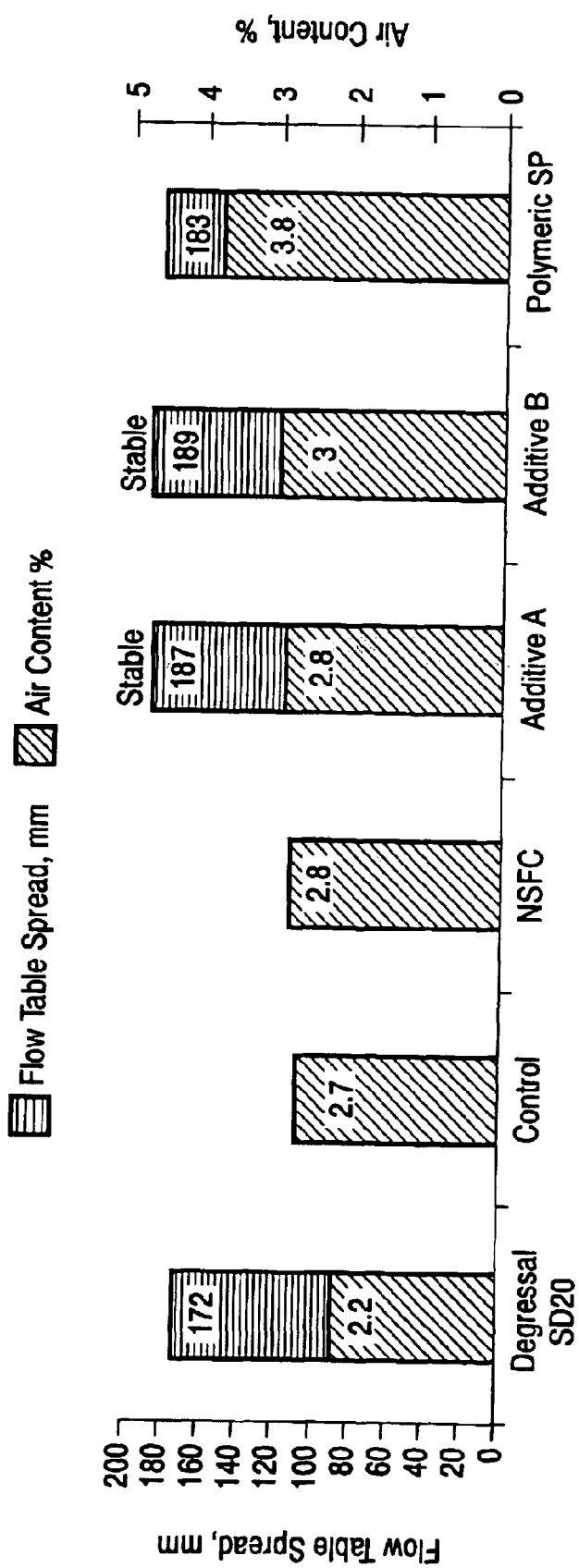

STABLE AQUEOUS POLYMERIC SUPERPLASTICIZER SOLUTIONS AND CONCRETE COMPOSITIONS CONTAINING THE SAME

FIELD OF THE INVENTION

The present invention relates generally to the use of certain block copolymers of ethylene oxide (EO) and propylene oxide (PO) as air-detraining agents that are stable in polymeric superplasticizers composed of comb polymers of alkylene oxide derivatives with acrylic acid derivatives.

BACKGROUND AND SUMMARY OF THE INVENTION

The use of comb polymers of ethylene oxide/propylene oxide derivatives with derivatives of acrylic acid as superplasticizers for concrete compositions is well-known in the art as evidenced, for example, by prior-issued U.S. Pat. Nos. 6,139,623; 5,703,174; 5,670,578; 6,063,184; 5,798,425; 5,583,183 and 5,633,298 (the entire content of each such patent being expressly incorporated hereinto by reference).

The use of comb polymers of ethylene oxide/propylene oxide derivatives with derivatives of sulfonic acids as superplasticizers is also known in the art as evidenced by U.S. Pat. No. 5,614,017 (the entire content of which is expressly incorporated hereinto by reference). In this regard, the '017 patent discloses the use of comb polymers of EO/PO with sulfonic acid derivatives as superplasticizer additives for cement compositions.

A typical example of a conventional comb polymer is one where the polymer has a monomeric unit comprised of carboxylic acid groups to which pendent groups comprising ethylene oxide and propylene oxide in various proportions are covalently attached. The use of such superplasticizers in cementitious compositions has several benefits such as, for example, significant reduction in the water content of the slurry, improved slump, high compressive strength, better freeze/thaw stability without causing significant retardation of the slurry.

The entrainment of air in concrete is known to be necessary to improve the freeze/thaw stability of concrete. However, air-entrainment in concrete needs to be carefully controlled. Air entraining agents such as rosins and anionic surfactants are commonly employed in concrete mixtures to control the size and the spacing of the air-bubbles formed in the concrete mix. Uneven spacing and/or excessively large size of the formed air-bubbles can lead to a loss of the concrete's compressive strength. An excessive amount of air entrainment can also result in a significant loss in the compressive strength of the concrete mix.

One negative side-effect of the use of polymeric superplasticizers is that they entrain excessive air in the concrete slurry. The industry has therefore attempted to correct this deficiency by adding air-detraining agents to the concrete mix. Examples of air-detraining agents are typically hydrophobic materials such as nonionic surfactants with low HLB, silicone derivatives, di-butylphosphates, and alkyl phthalates. Since such air-detraining agents are hydrophobic and have very limited solubility in water, they cannot be incorporated into the polymeric superplasticizer solution. That is, an attempt to incorporate such conventional air-detraining agents results in phase separation as evidenced by the formation of a separate hazy layer usually on top of the polymeric superplasticizer solution. As a result of this insolubility, the industry has been forced to use separate tanks to store the superplasticizer solution and the air-detraining agent respectively and to only mix these separate components immediately prior to their incorporation in the cement slurry. As an alternative to separate storage, the superplasticizer solution and the air-detraining agent may be pre-mixed in a tank provided with continues stirring so as to prevent the phase separation of these two components, in which case surfactant stabilizers which function as an emulsifier for the air-detraining agent and the polymeric superplasticizer may be employed (see, the above-cited U.S. Pat. No. 6,139,623). Both of the approaches noted above are disadvantageous in that they are a source of inconvenience to the contractor and also result in additional costs to the operation. Further, the incompatibility of the superplasticizer and the air-detraining agent limits their utility in other areas of application.

Applicants have surprisingly found that certain air-detraining agents based on low molecular weight block polyethers comprising ethylene oxide (EO) and propylene oxide (PO), and being initiated with an initiator containing reactive diamine or glycol groups, have excellent stability in the polymeric superplasticizer solution. Typically, such block polyethers will have molecular weights in the range from about 700 to about 3500. (All molecular weights express herein are number average molecular weights.) Furthermore, the block polyethers will most preferably comprise ethylene oxide in a weight ratio of from about 10% to about 70% based on the molecular weight of the polyether.

It has also been found that, when the polymeric superplasticizer solution and the air-detraining agent are mixed in the desired ratios, the result is a crystal clear, isotropic solution that has the desired shelf life for the operation. Typically, the air detraining agent is present in an air detraining effective amount of less than about 1.0% by weight of the polymeric superplasticizer solution. More preferably, the air detraining agent will be present in an amount of between about 0.01 wt. % to about 1 wt. %, and most preferably between about 0.1 wt. % to about 0.7 wt. %, based on the weight of the polymeric superplasticizer solution. An especially preferred amount of the air detraining agent is from about 0.1 wt. % to about 0.5 wt. %, based on the weight of the polymeric superplasticizer solution.

In one embodiment, therefore, the current invention comprises a polymeric superplasticizer and an air-detraining effective amount of an air detraining agent. Preferably, the polymeric superplasticizer is a comb polymer comprised of polycarboxylic acid or partial esters to which are attached pendent groups consisting essentially of polyoxyalkylene groups. The term "polyoxyalkylene" refers to a mixture of polyoxyalkylene groups such as polyethylene oxide, polypropylene oxide and polybutylene oxide. The comb polymer employed as a polymeric superplasticizer in accordance with the current invention can be represented by the following general formula (I):

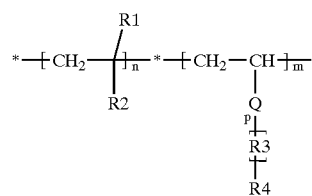

where $R_1$=H or $CH_3$;
$R_2$=COOM, $OCH_3$, $SO_3M$, O—CO—$CH_3$, CO—$NH_2$, preferably COOM, where M is a salt of Na, Ca, K, or Mg;
$R_3$=is an alkylene oxide group selected from the group consisting of ethylene oxide, propylene oxide and/or butylene oxide, and wherein the alkylene oxide groups can be in either a block or random distribution;
$R_4$=$CH_3$or alkyl;
Q=C(O)O, C(O)NH, $CH_2$O, $CH_2$N, O;
m and n are such that between 98% to 2 % of m units and between about 2% to about 98% of n units are present in the polymer; and
p is between 1 to 300. A particularly preferred polymeric superplasticizer is SOKALAN® HP 80 commercially available from BASF Corporation.

In another embodiment according to the present invention, the block polyether is a block copolymer of ethylene oxide and propylene oxide represented by the following general formula (II):

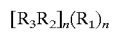

where $R_1$ is an initiator containing reactive terminal groups capable of adding to $C_2$–$C_4$ epoxides, such as ethylene oxide, propylene oxide and butylene oxide; $R_2$ is either propylene oxide or butylene oxide; $R_3$ is ethylene oxide, and n represents the functionality of the initiator and is a number greater than or equal to 2, and wherein $R_3$ and $R_2$ are interchangeable in the formula. Most preferably, ethylene oxide is employed, with up to about 30% of propylene oxide. Most preferably, the initiator $R_1$ is an alkylene diamine or glycol, such as etheylene diamine or propylene glycol.

These and other aspects and advantages will become more apparent after careful consideration is given to the following detailed description of the preferred exemplary embodiments thereof.

BRIEF DESCRIPTION OF THE ACCOMPANYING DRAWING

Reference will hereinafter be made to accompanying drawing FIG. 1, which is a bar chart graph of the data obtained from Example 2 below.

DETAILED DESCRIPTION OF THE INVENTION

As used herein, the term "superplasticizer" refers to a class of compounds which are capable of functioning to reduce water in aqueous cement compositions. Superplasticizers typically provide water reduction in such aqueous concrete compositions of at least about 12% (ASTM C494 Type F or Type G) and also produce flowing concrete according to ASTM C1017.

The present invention will necessarily include an air-detraining effective amount of a block polyether containing EO and PO units. Most preferably, the air-detraining additive will be at least one of the polyethers identified above as Formula II. The air-detraining additives will most preferably be homogeneously dispersed throughout a polymeric superplasticizer solution in amounts ranging from about 0.01 wt. % to about 1.0 wt. %, and more preferably between about 0.1 wt. % to about 0.7 wt. %, based on the weight of the polymeric superplasticizer solution. Most preferably, the air-detraining additives will be employed in amounts between about 0.1 wt. % to about 0.5 wt. % (±/− about 0.1 wt. %) based on the weight of the polymeric superplasticizer solution.

The polymeric superplasticizer may be any of those conventionally employed in the art. For example, one or more conventional polymeric superplasticizers, such as, for example, comb polymers having a carbon containing backbone to which are attached alkylene oxide groups via linkages such as an amide, imide, ester, or ether. Examples of such polymeric superplasticizers are copolymers of acrylic or methacrylic acid with the reaction product of acrylic acid or methacrylic acid with polyalkyleneglycol mono methyl ether. Another example of such polymeric superplasticizer is a copolymer of acrylic or methacrylic acid with the reaction product of acrylic acid or methacrylic acid with alcohol alkoxylates. Typically, the alcohol chain lengths involved are from $C_8$ to $C_{18}$.

The polymeric superplasticizer will typically be employed as an aqueous solution into which the air-detraining additives are mixed. The amount of superplasticizer solution in accordance with the present invention that is admixed with the cement compositions is dependent upon a variety of factors, including the particular cement composition, the ratio of components in the cement composition and/or the amount of fluidity desired. Generally, the amount of the polymer superplasticizer solution which is added to the cement compositions will be in amounts of at least about 0.005 wt. %, and usually in the range of 0.005 to about 5 wt. %, preferably 0.03 wt. % to about 1.0 wt. percent based on the total weight of the cement composition.

Conventional other additives, such as water-proofing agents, strength enhancers, corrosion inhibitors, and curing accelerators can be used with the superplasticizer solutions of the present invention.

The present invention will be further understood from the following non-limiting Examples:

EXAMPLES

Example 1

Evaluations of the stability of air-detraining additives were conducted by adding various air-detraining additives identified in Table 1 below to a polymeric superplasticizer solution. In this regard, a small dose, typically about 0.4% by weight based on the weight of the polymeric superplasticizer, of the air-detraining additive was introduced into the aqueous polymeric superplasticizer solution and the resulting mixture stirred to facilitate homogenous mixing. The stability of the solution was determined by visually inspecting the solution for signs of phase separation or cloudiness. Typically, additives that do not exhibit adequate stability in the polymeric superplasticizer solution will phase separate forming a hazy, insoluble layer at the top of the polymeric superplasticizer solution.

Since the amount of the detraining additive added to the polymeric superplasticizer solution is relatively small, it is preferred that instability be detected by holding the solution at eye level and observing the top of the solution while gently shaking the solution. Otherwise, a mere casual inspection of the solution may lead one to misinterpreting the solution as stable when, in fact, it is unstable. Evidence of a hazy layer dispersed in the clear solution at the top when observed as noted previously is a sign of instability.

Stability was also determined by subjecting the polymeric superplasticizer solution comprising the air-detraining additive to three successive freeze/thaw cycles and then evaluating the stability of the solution. Solutions that remained crystal clear at the end of the three freeze/thaw cycles were determined to be stable.

Likewise stability was also determined by subjecting the polymeric superplasticizer solution comprising the air-detraining additive to a constant temperature of 50° C. for one month and then determining the stability of the solution at the end of the aging period. Solutions that remained crystal clear at the end of the aging period were determined to be stable. With certain additives, it is possible that the increased temperature would cause the air-detraining additive to phase separate. However, in these cases, the solution returned to its crystal clear state after the sample was returned to ambient temperatures. Such solutions were also determined to be stable.

Table-1 below shows the air-detraining additives evaluated in the manner described above and their respective stabilities in the polymeric superplasticizer solution.

The aqueous polymeric superplasticizer solution employed in the Examples below included as the polymeric superplasticizer material, a copolymer of methacrylic acid, sodium salt and ester of alkyl polyethylene glycol commercially available as a 40% aqueous solution from BASF Corporation as SOKLAN® HP 80. The molecular weight varies from 15,000 to 25,000.

Additives A employed in the Examples below was an ethylene diamine initiated block copolymer of ethylene oxide and propylene oxide commercially available from BASE corporation as TETRONIC® 304 surfactant. More specifically, Additive A was a polymer in accordance with Formula II above wherein $R_1$ is ethylene diamine, $R_2$ is propylene oxide and $R_3$ is ethylene oxide. $R_2$ is first added to ethylene diamine to form a propylene oxide block and then $R_2$ is added to form the ethylene oxide block. The molecular weight of Additive A is about 1650. The molecular weight of the propylene oxide block is about 900–1000. The wt % of ethylene oxide in the product is about 40%. Preferred embodiment of such block polymers will have MW from about 750–3500, and further comprise of a propylene oxide block having a MW of about 500–1800 and ethylene oxide from about 10% to about 70% by weight of the surfactant. A more preferred embodiment of such block polymers will have molecular weights of from about 1000–2500, and further comprise of a propylene oxide block having a MW of about 700–1400 and ethylene oxide from about 10% to about 70% by weight of surfactant. Most preferably, such block polymers will have molecular weights of from about 1500–1900, and further comprise of a propylene oxide block having a MW of about 800–1200 and ethylene oxide from about 10% to about 70% by weight of the surfactant.

Additives B employed in the Examples below was a block copolymer of ethylene oxide and propylene oxide which is commercially available from BASF Corporation as PLURONIC® L35 surfactant. R1 is propylene glycol to which is added propylene oxide to form the PO block ($R_2$), followed by ethylene oxide to form the EO block ($R_3$). The molecular weight of the surfactant is about 1900. The molecular weight of the PO block is about 1000 and the wt. % of ethylene oxide is about 50% by weight of the total molecular weight of the surfactant. Preferred embodiment of such block polymers will have a MW from about 500–4000, and further comprise a propylene oxide block having a MW of about 600–1200 and ethylene oxide from about 30%–70% by weight of the surfactant. Preferably, such block copolymers will have a molecular weight of from about 700–2500, and further comprise a propylene oxide block having a molecular weight of from about 700–1100 and ethylene oxide from about 35%–65% by weight of the surfactant. Most preferably, such block copolymers will have a molecular weight of from about 800–2000, and further comprise a propylene oxide block having a molecular weight of from about 800–1000, and ethylene oxide from about 40 wt. %–50 wt. % of the surfactant.

The following conventional air-detraining additives commercially available from BASF Corporation were employed for purpose of comparison:

| Additive | Description |
|---|---|
| MASIL ® SF19 | silicone glycol with a viscosity of 40–50 centistokes |
| MAZU ® DF210S | silicone defoamer with a silicone content of about 10% |
| PLURAFAC ® LF 1200 and LF7000 | fatty alcohol alkoxylates with a cloud point of about 28° C. (in water) and 30° C. (in diethylene glycol monobutyl ether) |
| PLURONIC ® 17R2 | block copolymer of ethylene oxide and propylene oxide with a MW 2150 |
| PLURONIC ® L31 | block copolymer of ethylene oxide and propylene oxide with a MW 1100 |
| PLURONIC ® L64 | block copolymer of ethylene oxide and propylene oxide with a MW 3650 |
| POLY-G ® D 1000 | polypropylene glycol with a MW of 1000 |
| TETRONIC ® 701 | Ethylene diamine initiation tretrafunctional block of propylene oxide and ethylene oxide with a MW of 3600 |

TABLE 1

| Air-Detraining Additive | Polymeric Superplasticizer Solution |
|---|---|
| Masil SF19 | Cloudy |
| Mazu DF210S | Cloudy |
| Plurafac LF1200 | Cloudy |
| Plurafac LF7000 | Cloudy |
| Pluronic 17R2 | Cloudy |
| Pluronic L31 | Cloudy |
| Pluronic L64 | Cloudy |
| Pluronic L92 | Cloudy |
| Poly-G D1000 | Cloudy |
| Tetronic 701 | Cloudy |
| Additive A (Invention) | Clear |
| Additive B (invention) | Clear |

From Table 1 above it is evident that only Additives A and B exhibited the requisite stability in the polymeric superplasticizer solution.

Example 2

The performance characteristics of the polymeric superplasticizer solutions comprising the stable air-detraining additives in accordance with the present invention were then evaluated in concrete compositions. Specifically, an aqueous cementitious slurry was prepared using the components in Table 2 below:

TABLE 2

| Ingredient/Aggregate | Type/Size | Amount (g) |
|---|---|---|
| Quartz sand | F34 | 825 |
| Quartz sand | 0.15–0.6 mm | 1665 |
| Quartz sand | 0.5–1.25 mm | 2715 |
| Quartz sand | 1.5–3.0 mm | 1485 |
| Gravel | 3–8 mm | 3765 |
| Gravel | 8–16 mm | 3330 |
| Heidelberg Cement | CEM I 32.5R | 2475 |
| Potable Water | — | 1089 |

Rate of addition: 1:5.56 (Cement to Aggregates)
Water/Cement Ratio: 0.41 to 0.45

The aggregates were weighed into a mixer and were dry-mixed for 1 minute with a multi-flow stirrer. About two-thirds of the required quantity of water was poured into the dry-mixed aggregates within a period of about 30 seconds. The polymeric superplasticizer solution containing the air-detraining additive therein was then added along with the rest of the water over the next 30 seconds. The resulting concrete mix was thereafter stirred for an additional 3 minutes, with the complete cementitious slurry taking a total of about 5 minutes to prepare.

Flow tests in accordance with DIN 1048 Part 1, 3.2.1.2 were conducted on the cementitious slurry. Specifically, the extent to which the concrete flows out immediate after it has been mixed and then poured back into the slurry was determined. The slurry mixture was initially allowed to stand for exactly 29 minutes and 45 seconds, following which it was mixed again for another 15 seconds. The extent to which the slurry mixture flows out of the mixer was determined after the 30 minutes had elapsed. Similar measurements were taken at subsequent 30-minute intervals (i.e., 60 minutes, 90 minutes, 120 minutes, etc.) until the diameter of the concrete is less than 30 cm when it is poured out of the mixer.

The compressive strength of the concrete mixture was determined according to DIN 1048 Part 4. Specifically, the compressive strength of the concrete was measured after 24 hours and 28 days, respectively, and expressed in $N/mm^2$.

A test with no superplasticizer (Control) was performed before each set of measurements. The temperature was maintained at room temperature (i.e., 23–25° C.).

The results of such tests appear in accompanying drawing FIG. 1. As can be seen, the results show that both Additives A and B have the required stability in the polymeric superplasticizer of the invention and also are able to significantly reduce the excessive air entrained by the polymeric superplasticizer. The results also show that the reduction in the air-entrainment achieved by the stable, air-detraining additives of the invention allows the formulator to achieve very nearly the same air content as that attained with concrete slurries containing no superplasticizer (i.e., the "Control" in FIG. 1) or with conventional superplasticizers that do not entrain excessive air (i.e., Degressal SD20, sodium napthalene formaldehyde condensates (NSFC) and Polymeric SP (SOKALAN® HP80) in FIG. 1).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aqueous superplasticizer solution for concrete compositions comprising a polymeric superplasticizer and an air-detraining effective amount of an air detraining agent which includes block polyether containing ethylene oxide and propylene oxide units wherein the ethylene oxide units are oresent in an amount from 30% to 70% by weight of the block polvether, said block polyether having a number average molecular weight of from about 700 to about 3500, and the propylene oxide units have a number average molecular weight of from about 500 to about 1800. and wherein said block polyether being initiated with an initiator containing reactive diamine or glycol terminal groups capable of adding to $C_2$–$C_4$ epoxides.

2. The aqueous superplasticizer solution of claim 1, wherein the polymeric superplasticizer includes a comb polymer represented by the following general formula (I):

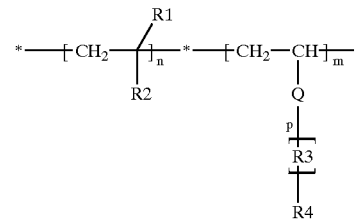

where $R_1$=H or $OH_3$;

$R_2$=COOM, $OCH_3$, $SO_3M$, O—CO—$CH_3$, CO—$NH_2$, where M is a salt of Na, Ca, K, or Mg;

$R_3$=an alkylene oxide group selected from the group consisting of ethylene oxide, propylene oxide and/or butylene oxide, and wherein the alkylene oxide groups can be in either a block or random distribution;

$R_4$=$CH_3$ or alkyl;

Q=C(O)O,C(O)NH, $CH_2$O, $CH_2$N, O;

m and n are such that between 98% to 2% of m units and between about 2% to about 98% of n units are present in the polymer; and p is between 1 to 300.

3. The aqueous superplasticizer solution of claim 2, wherein the air detraining agent includes a block polyether which is a block copolymer of ethylene oxide and propylene oxide represented by the following general formula (II):

wherein:

$R_1$ is an initiator containing reactive diamine or glycol terminal groups capable of adding to $C_2$–$C_4$ epoxides, $R_2$ is either propylene oxide or butylene oxide;

$R_3$ is ethylene oxide, and n represents the functionality of the initiator and is a number greater than or equal to 2, and wherein $R_3$ and $R_2$ are interchangeable in the formula.

4. The aqueous superplasticizer solution of claim 3, wherein the block polyether is a block copolymer of ethylene oxide and up to about 30% of propylene oxide.

5. The aqueous superplasticizer solution of claim 3, wherein the air detraining agent is dispersed throughout the solution in an amount from about 0.01 wt. % to about 1.0 wt. %.

6. The aqueous superplasticizer solution of claim 5, wherein the air detraining agent is dispersed throughout the solution in an amount from about 0.01 wt. % to about 0.7 wt. %.

7. The aqueous superplasticizer solution of claim 5, wherein the air detraining agent is dispersed throughout the solution in an amount from about 0.1 wt. % to about 0.5 wt. %.

8. A cement composition which comprises a hydraulic cement and an aqueous superplasticizer solution as in any one of claims 1–7.

9. The composition of claim 8, wherein the superplasticizer solution is present in an amount of at least about 0.005 wt. %, based on the total weight of the cement composition.

10. The composition of claim 9, wherein the superplasticizer solution is present in an amount from about 0.005 wt. % to about 5.0 wt. %.

11. The composition of claim 9, wherein the superplasticizer solution is present in an amount from about 0.03 wt. % to about 1.0 wt. %.

12. An aqueous superplasticizer solution for concrete compositions comprising a polymeric superplasticizer and an air-detraining effective amount of an air detraining agent which includes an ethylene oxide-propylene oxide block polyether having a number average molecular weight of from about 700 to about 2500 and being initiated with an initiator containing reactive diamine or glycol terminal groups, and wherein said block polyether has from 30% to 70% by weight of ethylene oxide blocks, and wherein the propylene oxide blocks have a number average molecular weight of from about 600 to about 1200.

13. The aqueous superplasticizer solution of claim 12, wherein the block polyether has from about 35% to about 65% by weight of ethylene oxide blocks.

14. The aqueous superplasticizer solution of claim 13, wherein the initiator is ethylene diamine or propylene glycol.

15. The aqueous superplasticizer solution of claim 14, wherein the air detraining agent is dispersed throughout the solution in an amount from about 0.01 wt. % to about 1.0 wt. %.

16. The aqueous superplasticizer solution of claim 15, wherein the air detraining agent is dispersed throughout the solution in an amount from about 0.01 wt. % to about 0.7 wt. %.

17. The aqueous superplasticizer solution of claim 15, wherein the air detraining agent is dispersed throughout the solution in an amount from about 0.1 wt. % to about 0.5 wt. %.

18. A cement composition which comprises a hydraulic cement and an aqueous superplasticizer solution as in any one of claims 12–17.

* * * * *